Dec. 26, 1967  F. HEIL  3,359,800
FLUID LEVEL INDICATOR FOR ENVELOPE-FLAP-MOISTENING DEVICES
Filed Dec. 15, 1965  2 Sheets-Sheet 1

INVENTOR:
Friedrich Heil

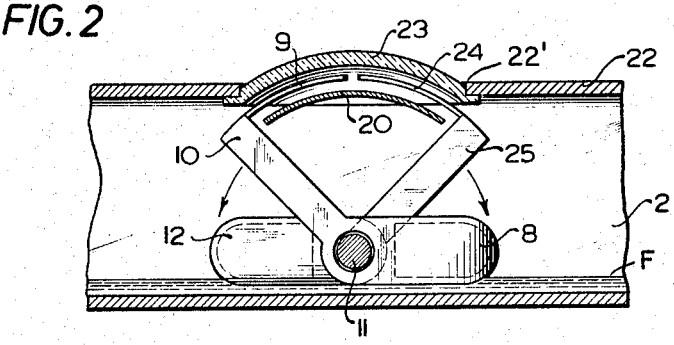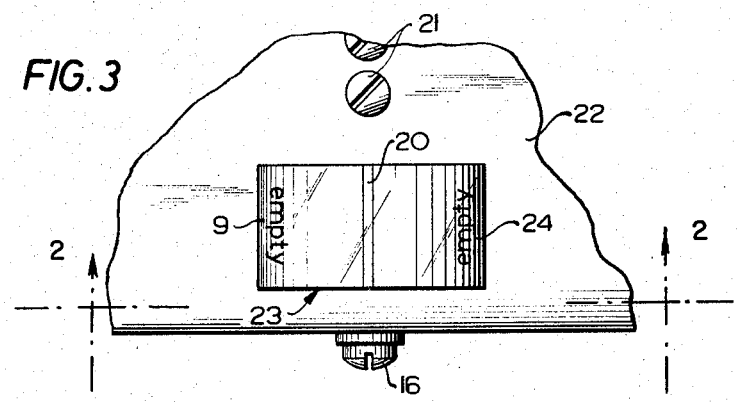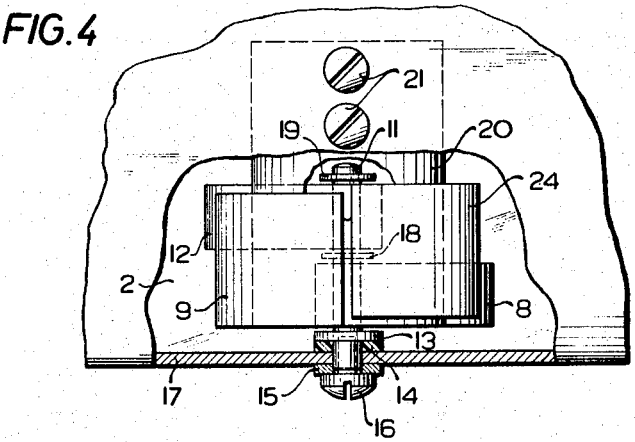

3,359,800
FLUID LEVEL INDICATOR FOR ENVELOPE-
FLAP-MOISTENING DEVICES
Friedrich Heil, Frankfurt am Main, Germany, assignor to Telefonbau und Normalzeit G.m.b.H., Frankfurt am Main, Germany
Filed Dec. 15, 1965, Ser. No. 514,039
5 Claims. (Cl. 73—311)

This invention relates to fluid level indicators, and more particularly to fluid level indicators for envelope-flap-moistening devices, as frequently used in connection with postage meters.

It is a general object of this invention to provide improved fluid level indicators.

It is another object of this invention to provide fluid level indicators which are more readily readable than prior art fluid level indicators, particularly in instances where the eye level of the person viewing the fluid level indicator is higher than the level at which the fluid level indicator is positioned.

Envelope-flap-moistening devices as frequently used in conjunction with postage meters include a supply of water for moistening the flaps of envelopes. It is of considerable importance that this supply of water be replenished in appropriate intervals of time with a minimum of effort on the part of the personnel maintaining the flap-moistening device. In conventional flap-moistening devices the maintenance operations are difficult to perform on account of the fact that the water supply is relatively shallow, e.g. in the order of one inch, and that it is arranged way below the eye level of maintenance personnel. As a result of these conditions it is very difficult to read conventional water-gauges comprising a tubular gauge glass.

It is, therefore, another object of this invention to provide a fluid level indicator for envelope-flap-moistening devices which is not subject to the above limitations and drawbacks, and which can be read conveniently and rapidly by an observer at a relatively large distance.

For a better understanding of the fluid level indicator according to the present invention reference is made to the following description which is taken in conjunction with the accompanying drawings, of which FIGURE 1 is an isometric representation of a combined postage meter and envelope-moistening device embodying the present invention;

FIGURE 2 is a vertical section of a fluid level indicator embodying the present invention taken along 2—2 of FIG. 3 and showing the constituent parts of the fluid level indicator in the respective empty positions thereof;

FIGURE 3 is a top plan view of the structure of FIG. 2 likewise showing the constituent parts thereof in their respective empty positions; and FIGURE 4 is a top plan view of the structure of FIGS. 2 and 3 some parts being broken away to expose other parts to view, all parts being likewise shown in the respective empty positions thereof.

Figure 1:
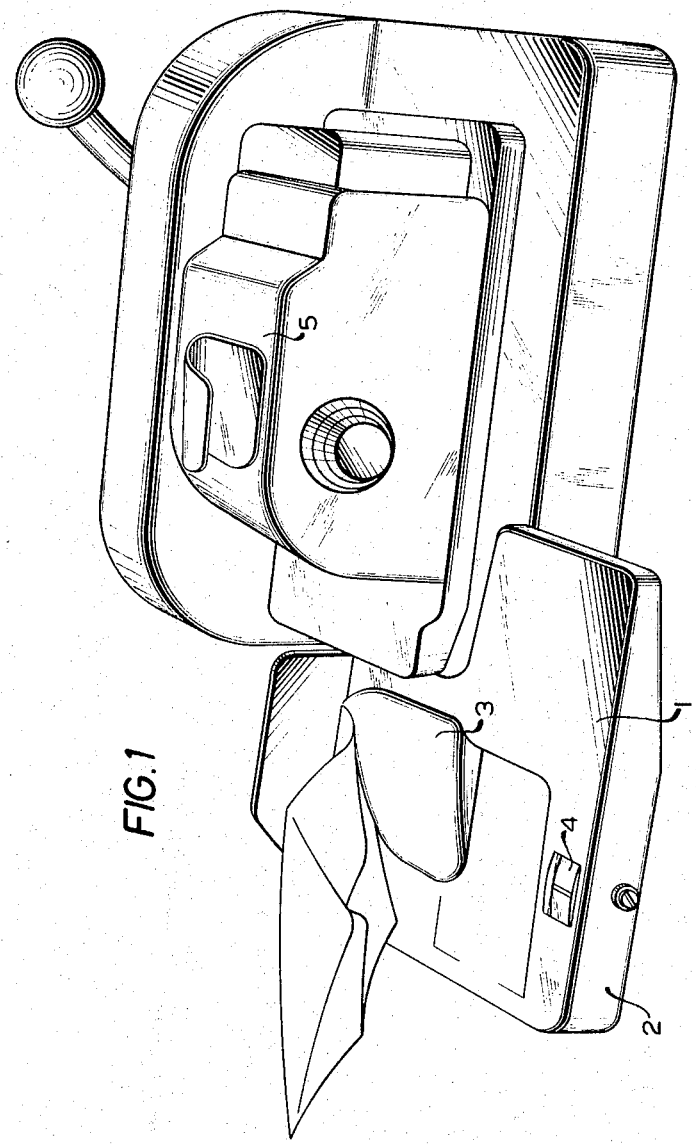

Referring now to the drawings, and more particularly to FIG. 1 thereof, numeral 5 has been applied to generally indicate a postage meter of conventional design and of conventional mode of operation. Envelope-flap-moistening device 1 is arranged adjacent postage meter 5 to the left thereof and comprises a housing 2 to be used as a supply of water and a moistening device 3 proper such as, for instance, a porous moist pad. Housing 2 is provided at the top-surface thereof with a window-like aperture which exposes to view a fluid level indicator embodying the present invention, generally indicated by reference character 4.

Referring now to FIGS. 2–4, inclusive, reference character 22 has been applied to indicate the top panel of the same housing 2 shown in FIG. 1. Top panel 22 is provided with a rectangular window-like aperture 22' which is closed by a transparent closing element or lens 23 in the shape of a sector of a cylinder surface. Closing element or lens 23 may be of glass, or of a transparent plastic substance, and thus exposes to view the parts of the fluid level indicator which are arranged behind it.

Reference characters 9 and 24 have been applied to indicate a pair of relatively movable masks arranged inside of housing 2 to be viewed through aperture 22'. Masks 9 and 24 are in the shape of sectors of a cylindrical surface, and are coaxial to the cylindrical surface defined by closing element or lens 23. Masks 9, 24 have juxtaposed, parallel straight edges which define a straight gap therebetween. A pair of floats 8 and 12 is arranged inside of housing 2 for operating one of masks 9, 24 respectively, in response to changes of level of a fluid inside of housing 2. When the level of fluid inside of housing 2 has decreased to a predetermined minimum, indicated by the reference character F, the fluid supply is deemed to be empty. Reference character 11 has been applied to indicate a common shaft for pivotally supporting floats 9 and 24. A small portion of float 8 is situated to the left of shaft 11, and its preponderant portion is situated to the right of shaft 11. Float 12 is identical to float 8, however, but a small portion of float 12 is situated to the right of shaft 11, and its preponderant portion is situated to the left of shaft 11. Shaft 11 is provided with a collar 13, the sealing washer 14 and the washer 15 and secured to the front side panel 17 of housing 2 by means of a coaxial screw 16. Additional washers 18 and 19 maintain each of floats 8 and 12 in its respective proper position along shaft 11. Reference numeral 20 has been applied to indicate a fixed cylindrical mask arranged behind the movable masks 9 and 24 and secured to housing 2 by a pair of screws 21. Masks 9 and 24 are movable inside if the cylindrical gaps bounded by closing element or lens 23 and by fixed mask 20. Mask 9 and float 8 are made integral by an arm or link 10 extending radially outward from shaft 11. In a like fashion movable mask 24 and float 12 are tied together by an arm or link 25 extending radially outward from shaft 11. Movable masks 9 and 24 and fixed mask 20 are preferably colored differently in contrasting colors. Movable masks 9 and 24 may be colored in a saturated red, and fixed or stationary mask 20 may be colored in a saturated blue.

When the level of fluid in housing 2 is at its lowest, as indicated by reference character F in FIG. 2, floats 8 and 12 and links 10 and 25 and movable masks 9 and 24 are each in their respective empty position shown in FIG. 2. Movable masks 9 and 24 are provided with a warning inscription at points thereof sufficiently remote from the pair of juxtaposed edges of masks 9 and 24 which define a gap therebetween to be invisible as long as the supply of fluid does not need to be replenished. The warning inscriptions on masks 9 and 24 become visible behind lens 23 only when the fluid level is extremely low. As shown in FIG. 3 the aforementioned warning inscription reads "EMPTY." This warning inscription in combination with the color of masks 9 and 24, which are fully exposed to view when housing 2 is substantially empty, calls attention to the need of replenishing the fluid supply inside of housing 2. When the fluid supply inside of housing 2 is substantially exhausted, the gap between the juxtaposed straight edges of masks 9 and 24 is very narrow, and exposes to view but a very narrow center strip of fixed mask 20 arranged under movable masks 9 and 24.

When the supply of water inside of housing 2 is being replenished parts 8, 10 and 9 pivot as a unit in counterclockwise direction, as indicated by the left hand arrow in FIG. 2. Replenishing of the water supply inside of housing 2 results in a like joint pivotal motion of parts 12, 25 and 24 in clockwise direction, as indicated by the right hand arrow in FIG. 2. As a result, masks 9 and 24 are being moved behind the front panel 22 of housing 2, and are no longer visible through the aperture 22'. Now the lower fixed mask 20 is exposed to view in its entirety.

As the level of fluid inside of housing 2 is being progressively lowered, parts 8, 10 and 9 pivot in counter-clockwise direction, and parts 12, 10 and 9 pivot in clockwise direction about shaft 11, thus progressively exposing to view the upper surfaces of movable masks 9 and 24, and progressively obstructing from view the upper surface of fixed mask 20. The position of movable masks 9 and 24 relative to fixed mask 20 and the width of the gap between masks 9, 24 is a quantitative indication of the level of fluid inside of housing 2.

While the principles of the invention have been described above in connection with a specific embodiment of the invention, it is to be understood that this description is made by way of example, and not as a limitation on the scope of the invention.

I claim as my invention:

1. A fluid level indicator comprising in combination:
 (a) a housing having a window-like aperture;
 (b) a pair of masks movable relative to each other arranged inside said housing in a position viewable through said aperture, said pair of masks having juxtaposed edges defining a gap of variable width between said pair of masks;
 (c) a pair of floats inside said housing each for operating one of said pair of masks in response to changes of the level of a fluid inside said housing; and
 (d) a pair of operating mechanisms each operatively connecting one of said pair of masks to one of said pair of floats to move said pair of masks in opposite directions in response to changes of the level of a fluid inside said housing to change the width of said gap between said pair of masks in response to said changes.

2. A fluid level indicator as specified in claim 1 comprising a shaft pivotally supporting said pair of floats, the predominant portions of said pair of floats being arranged to opposite sides of said shaft and each of said pair of floats pivoting in an opposite direction in response to changes of the level of a fluid inside said housing.

3. A fluid level indicator as specified in claim 1 wherein each of said pair of movable masks is in the shape of a sector of a cylindrical surface, wherein each of said pair of floats is arranged with the predominant portion thereof to an opposite side of a common shaft pivotally supporting said pair of floats, and wherein each of said pair of floats is tied to one of said pair of masks by a tie link extending radially outward from said common shaft.

4. A fluid level indicator as specified in claim 3 wherein said window-like aperture is closed by a transparent closing element in the shape of a sector of a cylindrical surface, and wherein a fixed mask in the shape of a sector of a cylindrical surface is arranged behind said window-like aperture and behind said pair of movable masks.

5. A fluid level indicator as specified in claim 3 wherein each of said pair of movable masks is provided with a warning inscription at a point sufficiently remote from said pair of juxtaposed edges thereof to be normally invisible through said window-like aperture and to become visible through said window-like aperture only in response to operation of said pair of movable masks by said pair of floats resulting from a reduction of the fluid level inside said housing to a predetermined minimum level.

References Cited

UNITED STATES PATENTS

| | | | |
|---|---|---|---|
| 1,298,606 | 3/1919 | Webster | 116—118 X |
| 1,391,146 | 9/1921 | Tibbetts | 73—317 X |
| 1,525,294 | 2/1925 | Guint, et al. | 73—311 |

FOREIGN PATENTS 653,112  10/1928  France.

LOUIS R. PRINCE, *Primary Examiner.*

DANIEL M. YASICH, *Assistant Examiner.*